United States Patent Office 2,842,554
Patented July 8, 1958

2,842,554
N,N'-ALKYLTETRAMETHYLENE THIURAM DISULFIDES

Frank A. V. Sullivan, Glenbrook, Conn., assignor to American Cyanamid Company, New York, N. Y., a corporation of Maine No Drawing. Application January 9, 1956
Serial No. 557,825

3 Claims. (Cl. 260—313)

This invention relates to new chemical compounds. More particularly, it relates to thiuram disulfides, expecially tetramethylene thiuram disulfides having the formula

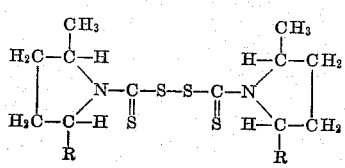

wherein R is selected from the group consisting of H and methyl.

The new compounds in accordance with this invention are useful in various fields. They have been found to be of particular value as rubber chemicals, however, especially as rubber vulcanization accelerators and as activators for other accelerators.

The thiuram disulfides of this invention may be prepared by oxidizing an aqueous solution of a salt of the corresponding alkyl substituted tetramethylene dithiocarbamic acid.

The following examples further illustrate the invention. All parts are by weight unless otherwise indicated.

EXAMPLE 1

N,N'-2-methyltetramethylene thiuram disulfide

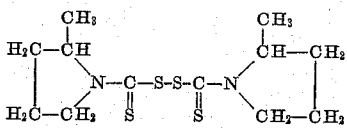

28.6 parts of sodium 2-methyltetramethylene dithiocarbamate are dissolved in 150 parts of water. To this is added dropwise at 25–35° C. a mixture of 9.3 parts of glacial acetic acid and 2.65 parts of a 30% solution of hydrogen peroxide. On completion of addition the reaction mixture is digested for 0.5 hours and then filtered. The product is washed, dried and recrystallized to give a 64% yield of product melting at 128–131° C. Percent Nitrogen-theory 8.75; found 8.71.

EXAMPLE 2

N,N'-2,5-dimethyltetramethylene thiuram disulfide

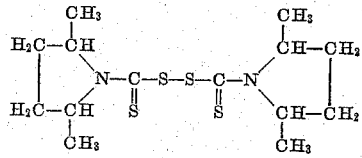

13.8 parts of sodium N,N-2,5-dimethyltetramethylene dithiocarbamate are dissolved in 125 parts of water. To this solution is added dropwise at 5–10° C. a mixture of 3.2 parts of a 30% solution of hydrogen peroxide and 6.8 parts of concentrated hydrochloric acid and 35 parts of water. On completion of addition the reaction mixture is digested an additional 0.5 hour and filtered. The product is washed and dried to give an 86% yield of product melting at 144–148° C.

Natural rubber compositions were prepared according to the following basic formula:

| Constituents: | Parts |
|---|---|
| Smoked sheets | 100 |
| Zinc oxide | 5 |
| Stearic acid | 1 |
| Whiting | 80 |
| Sulfur | 2 |
| Light process oil | 2 |
| Accelerator | 0.3 |

Samples of this composition were then cured at 130° C. for periods of 15 and 20 minutes and then tested for modulus, tensile and elongation. Results appear in Table I.

TABLE I

| Compound | 15 Min. Cure | | | 20 Min. Cure | | |
|---|---|---|---|---|---|---|
| | Mod.[1] 500% | Tens.[1] | Percent Elong. | Mod., 500% | Tens. | Percent Elong. |
| N,N' - 2 - methyl tetramethylene thiuram disulfide | 1,200 | 2,875 | 700 | 1,250 | 2,850 | 680 |

[1] Modulus and tensile in p. s. i.

I claim:
1. A compound selected from the group consisting of N,N'-2-methyltetramethylene thiuram disulfide and N,N'-2,5-dimethyltetramethylene thiuram disulfide.
2. N,N'-2-methyltetramethylene thiuram disulfide.
3. N,N'-2,5-dimethyltetramethylene thiuram disulfide.

References Cited in the file of this patent
UNITED STATES PATENTS

| 2,283,336 | Neal et al. | May 19, 1942 |
| 2,690,440 | Himel et al. | Sept. 28, 1954 |
| 2,792,394 | Himel et al. | May 14, 1957 |

OTHER REFERENCES

Oddo et al.: Chem. Abstracts, vol. 32, p. 7450 (1938).
Davies et al.: Chem. Abstracts, vol. 41, col. 405 (1947).